United States Patent [19]

Saito et al.

[11] Patent Number: 5,515,368
[45] Date of Patent: May 7, 1996

[54] INFORMATION TRANSMISSION SYSTEM WITH VARIABLE TRANSMISSION RATE

[75] Inventors: Atsushi Saito, Ichikawa; Yoshitaka Takasaki, Tokorozawa; Taizo Kinoshita, Musashimurayama; Shigeki Kitajima, Kokubunji, all of Japan

[73] Assignee: Hitachi, Ltd., Tokyo, Japan

[21] Appl. No.: 226,301

[22] Filed: Apr. 12, 1994

[30]  Foreign Application Priority Data

Apr. 13, 1993 [JP] Japan ..................................... 5-085876

[51] Int. Cl.$^6$ ..................................................... H04J 3/22
[52] U.S. Cl. .............................. 370/61; 370/84; 370/118; 379/269
[58] Field of Search .......................... 370/84, 58.2, 58.3, 370/32, 119, 42, 61, 62, 79, 110.1, 118; 375/222, 377, 240, 225; 395/425, 275, 325; 379/157, 207, 220, 224, 227, 243, 67, 88, 89, 268, 269; 340/825.06, 825.15

[56]  References Cited

U.S. PATENT DOCUMENTS

| | | | |
|---|---|---|---|
| 4,802,190 | 1/1989 | Schouhamer | 375/122 |
| 4,884,267 | 11/1989 | Miyamoto et al. | 370/84 |
| 4,912,702 | 3/1990 | Verbiest | 370/84 |
| 5,023,869 | 6/1991 | Grover et al. | 370/121 |
| 5,157,651 | 10/1992 | Ghelberg et al. | 370/84 |
| 5,179,556 | 1/1993 | Turner | 370/84 |
| 5,199,027 | 3/1993 | Barri | 370/84 |
| 5,231,631 | 7/1993 | Buhrke et al. | 370/60 |
| 5,321,649 | 7/1993 | Duncanson | 370/84 |

Primary Examiner—Alpus H. Hsu
Assistant Examiner—Ricky Q. Ngo
Attorney, Agent, or Firm—Fay, Sharpe, Beall, Fagan, Minnich & McKee

[57]  ABSTRACT

A method and system for information processing in a bidirectional information transmission system, particularly for transmitting information in accordance with a change in a transmission capacity of a transmission line. A system is provided which can change an information transmission rate in accordance with a room capacity of a transmission line. This information transmission system includes a plurality of information providers, a plurality of information receivers, an information storage and distribution unit connected to the information providers and receivers, and a plurality of information transmission lines for information transmission between the information providers and receivers and the information storage and distribution unit, wherein the information transmission rate of each information transmission line is changed.

24 Claims, 7 Drawing Sheets

| CASE | OUTPUT TRANSMISSION SPEED OF STORAGE | INPUT TRANSMISSION SPEED OF CODER | OUTPUT TRANSMISSION SPEED OF CODER | LINE TRANSMISSION SPEED |
|---|---|---|---|---|
| 1 | CONSTANT | CONSTANT | VARIABLE | CONSTANT |
| 2 | CONSTANT | CONSTANT | VARIABLE | VARIABLE |
| 3 | CONSTANT | VARIABLE | VARIABLE | CONSTANT |
| 4 | CONSTANT | VARIABLE | VARIABLE | VARIABLE |
| 5 | VARIABLE | CONSTANT | VARIABLE | CONSTANT |
| 6 | VARIABLE | CONSTANT | VARIABLE | VARIABLE |
| 7 | VARIABLE | VARIABLE | VARIABLE | CONSTANT |
| 8 | VARIABLE | VARIABLE | VARIABLE | VARIABLE |

*FIG. 3*

FIG. 4a  (1) CASE 1

FIG. 4b  (2) CASE 2

FIG. 4c  (3) CASE 3

FIG. 4d  (4) CASE 4

FIG. 5a
(5) CASE 5

FIG. 5b
(6) CASE 6

FIG. 5c
(7) CASE 7

FIG. 5d
(8) CASE 8

INFORMATION TRANSMISSION SYSTEM WITH VARIABLE TRANSMISSION RATE

BACKGROUND OF THE INVENTION

The present invention relates to an information processing system for a bidirectional information transmission system using a broadband ISDN, a cable television network, a public telephone network, or the like. More particularly, the invention relates to an information transmission method and information storage method capable of transmitting information while taking into consideration a change in the transmission capacity of a network.

In an information provider system using a telephone network, for example, there are services for providing various types of voice information and video information by using the idle time of a telephone line. A video communications system is constructed of central equipment for transmitting video information, home equipment including home peripheral terminals and video receivers, and exchange center equipment interconnecting central equipment and home equipment.

The characteristic features of a video communications system are as follows. Information can be unidirectionally provided at a low cost. Video information may be used for supplementing voice information. Interactive services and information retrieval services can be provided by using a bidirectional transmission function of each terminal equipment.

The above-described communications system uses a constant transmission rate of information to be transmitted over a communication line. As a result, even if the room capacity of the communication line is sufficient, it takes the same time to transmit the same amount of information to each subscriber.

Although the above-described communications system provides a function of bidirectional information transmission, services it provides are limited and most of the services are provided unidirectionally from information providers. Furthermore, each central equipment provides its own particular information so that if the equipment has no information desired by a subscriber, the subscriber has to inquire for the information from another information provider via a telephone exchange.

SUMMARY OF THE INVENTION

The present invention provides a system capable of setting an information transmission rate variable with the room capacity of a transmission line. This system includes a plurality of information providers, a plurality of information receivers, means for exchanging/storing/distributing information between the information providers and the information receivers, transmission means for transmitting information between the information providers and the information exchange/storage/distribution means and between the information receivers and the information exchange/storage/distribution means, means for monitoring a transmission capacity of the transmission means, and information storage and distribution means for setting an information transmission rate variable with the results monitored by the monitoring means.

The information storage means stores information such as video and audio information. A time required for reading information from the storage means becomes inversely proportional to an information transmission rate. If the information transmission capacity of a transmission line is sufficient, i.e., if the number of subscribers presently using the transmission line is small, it becomes possible to transmit information in a short time by temporarily increasing the transmission capacity (transmission rate). Alternatively, the speed of reading information from the information storage means may be increased while maintaining the transmission rate per unit information constant. In this case, the transmission rate of information whose capacity sequentially changes from time to time, such as video information, can be reduced equivalently. By changing the speed of reading information from the information storage means and maintaining the information transmission rate constant, information can be transmitted without filling dummy information.

The above-described two methods may be used in combination to further improve the information transmission efficiency. That is, the transmission rate is increased while the transmission capacity of a transmission line is sufficient, and at the same time the speed of reading information from the information storage means is changed (increased in a general case) so as to set the transmission rate to a predetermined one of a plurality of discretely set information transmission rates.

DESCRIPTION OF THE PREFERRED EMBODIMENTS

Embodiments of the present invention will be described in detail.

Figure 1:
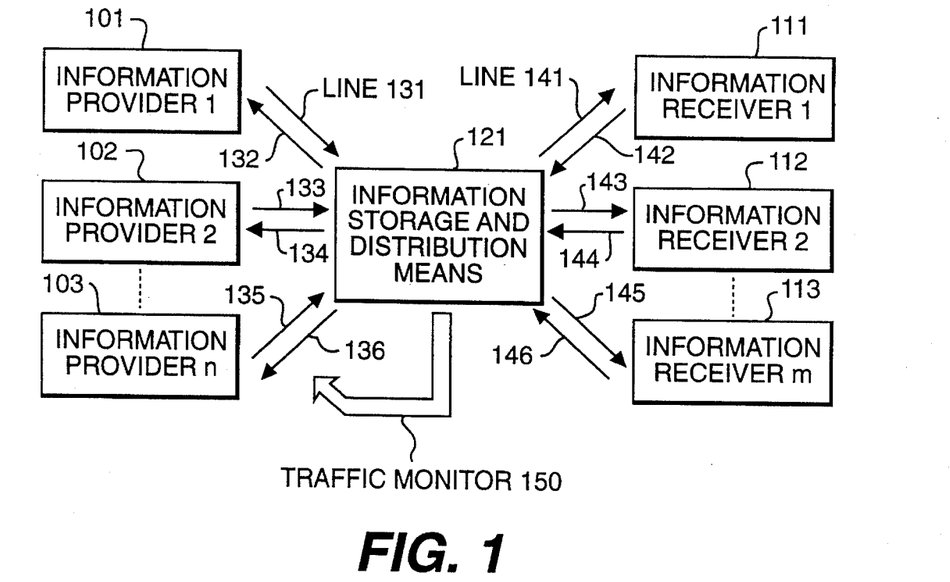
FIG. 1 is a schematic block diagram showing an information transmission system according to an embodiment of the present invention.

FIG. 1 is a schematic block diagram showing the structure of an information transmission system according to an embodiment of the invention. A plurality of information providers 1–n (101–103) and a plurality of information receivers 1–m (111–113) are connected via an information storage and distribution unit 121 by transmission lines 131–136 and 141–146. The information storage and distribution unit 121 monitors an information room capacity (traffic) 150 of each transmission line 131–136 to each information provider 1–n (101–103). In accordance with the traffic monitor results, the information storage and distribution unit 121 controls a transfer speed of information transmitting over a transmission line. For example, the information storage and distribution unit 121 changes a transmission rate of information transmitted to and from the information storage and distribution unit 121, a data transfer rate at each information provider, or a data transfer rate at each information receiver.

If the transmission capacity of an information transmission line increases, i.e., if a transmission available capacity increases, the information transmission rate is raised, whereas on the other hand if the transmission capacity decreases, i.e., if the transmission available capacity decreases, the information transmission rate is lowered. The transmission rate may be changed discretely in accordance with the transmission capacity. Information transmission may be stopped when the transmission capacity becomes lower than a predetermined level, to restart the transmission when the capacity is recovered. The information transmission rate may be set in advance so as to increase it during a particular day or the period when the transmission capacity is expected to increase. If the monitored transmission capacity of one transmission line lowers, another transmission line may be used to transmit information.

Of real-time information such as information on a telephone line and information on an interactive information service line and non-real-time information such as information of an email and information on a periodical or appointed time information delivery service line, the non-real-time information may be transmitted efficiently by batch processing during a period having a less amount of real-time information.

Each information provider 1–n has an information storage for storing information such as moving picture information, still picture information, voice information, and code data information. The contents of information include text images, graphics images, movie images, news information, guidance information, and information exchanged between subscribers.

In addition to the information once stored in the information storage, immediate information may also be used. However, it is more effective to transmit information once stored in the information storage, in order to reduce a usage charge by changing the transmission rate in accordance with the room capacity of a transmission path (line) or in order to shorten the time required for the transmission of all information under a sufficient room capacity.

Various information stored at each information provider is supplied upon an information transmission request from an information receiver. The information transmission request is sent from an information receiver to the information storage and distribution unit which transfers it to the information provider. This information transmission request is sent at a constant transmission rate irrespective of a transmission capacity of a transmission line.

According to the present invention, a highly efficient information transmission system is provided in which the transmission rate of information on a transmission line is controlled in accordance with the transmission line capacity or available transmission capacity, in order to execute, stop, or resume information transmission.

Figure 2:
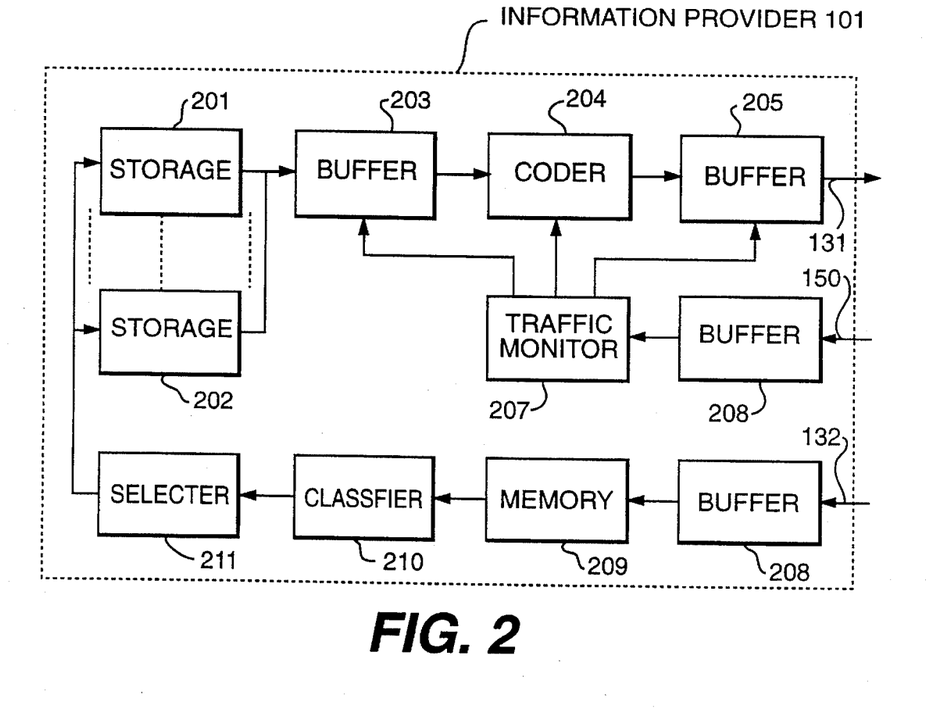
FIG. 2 is a block diagram showing the structure of an information provider.

FIG. 2 is a block diagram showing an example of the structure of the information provider 101. The other information providers 102 and 103 may have the same structure. The information provider 101 has at least one storage 201, 202 for storing information such as video and audio information. In FIG. 2, the storages 201 and 202 do not have a circuit for adjusting a transmission rate, and separately provided with buffers 203, 205, and a coder 204. In an actual configuration, the storages 201 and 202 may include the buffers and the coder which will be detailed later.

A plurality of storages are switched on line at once to supply different information, for example, movie information A from the storage 201 and movie information B from the storage 202. The mechanism for changing the transmission rate at each storage will be described later in detail.

In the information transmission system allowing the information transmission rate to be changed in accordance with the traffic of a transmission line, one of the following two transmission rate changing methods may be used.

The first method changes the transmission rate by changing the speed of reading data from the storage 201, 202. For example, if a disk or tape is used as the storage, a relative speed between a read head and a storage medium may be changed. The amount of data read from the storage may be changed by changing the number of read heads which reads data in parallel from a disk or tape. If a semiconductor memory is used as the storage, the speed of reading data from the memory may be changed.

The second method changes the transmission rate by changing the speed of data transfer in each buffer 203 or 205. The buffer may be realized by a semiconductor memory. In operation of the buffer, the speed of data input/output of the buffer is changed by the buffer memory of the buffer.

An output of the buffer 203 is inputted to the coder 204 and then supplied to the buffer 205 which outputs information to the transmission line 131. The speeds at the buffer 203, coder 204, and buffer 205 are adapted to be changed in accordance with the results of a monitored traffic 150 on the transmission line detected by a traffic detector 207. The configurations and operations of the storage 201, buffer 202, coder 204, and buffer 205 will be described hereinafter.

Transmission request or demand information received from the transmission line 132 is stored in a memory 209 via a buffer 208. A disk or tape may be used as this memory 209. If this memory is to be dedicated in use mainly for the demand information, a semiconductor memory is preferable from the viewpoint of efficiency. A classifier 210 analyzes the contents of a demand and outputs the analyzed results to a selector 211 which selects one of the storages 201, 202 in which information requested by the subscriber has been stored.

Figure 3:
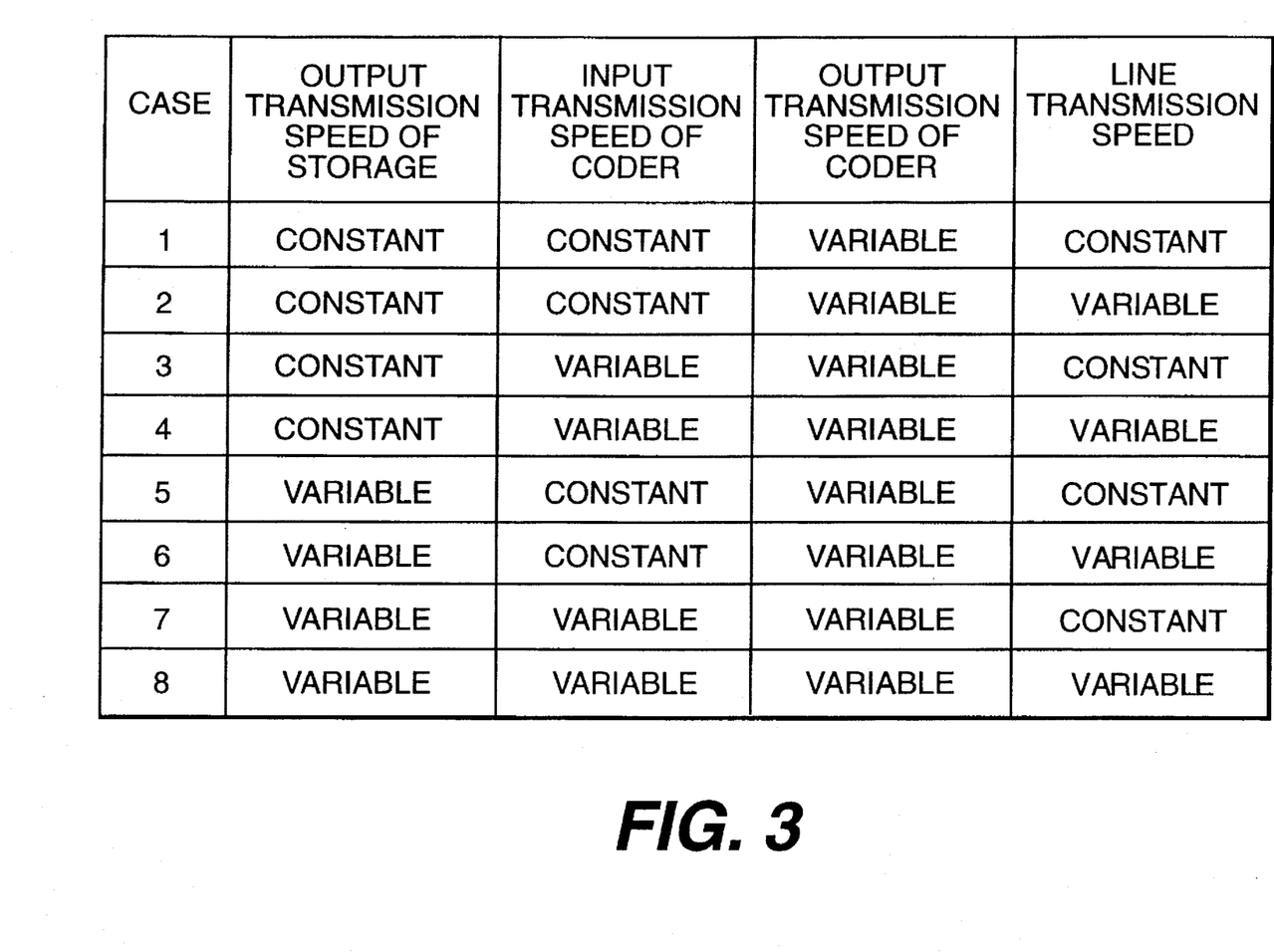
FIG. 3 is a table showing combinations of data transfer speeds at each constitutional element shown in FIG. 1.

FIG. 3 is a table showing combinations of data transfer speeds at each constitutional element from the storage to the transmission line shown in FIG. 2. Cases Nos. 1 to 4 apply to where the speed of reading information from the storage is constant, whereas cases. Nos. 5 to 8 apply to where the data read speed at the storage is variable. These cases are illustrated in FIGS. 4a to 4d and 5a to 5d.

Figure 4A:
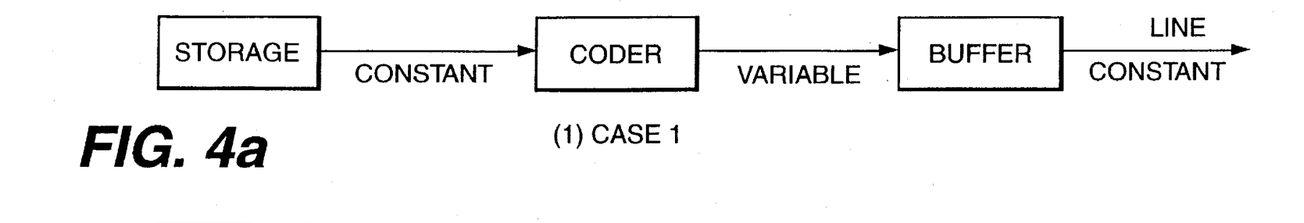
FIGS. 4a to 4d are block diagrams showing various types of variable data transfer configurations of an information provider set in accordance with the combinations shown in FIG. 3.

In the case No. 1 shown in FIG. 4a, the data read speed at the storage as well as the transmission rate at the transmission line is maintained constant. In the case No. 1, a buffer between the storage and coder is not necessary, and raw information before coding is stored in the storage. The data transfer speed at the coder changes with the contents of information inputted thereto. For example, the speed of coding is increased for a complicated image having greatly different density information, and is reduced for a simple image having generally uniform density information.

Figure 4B:
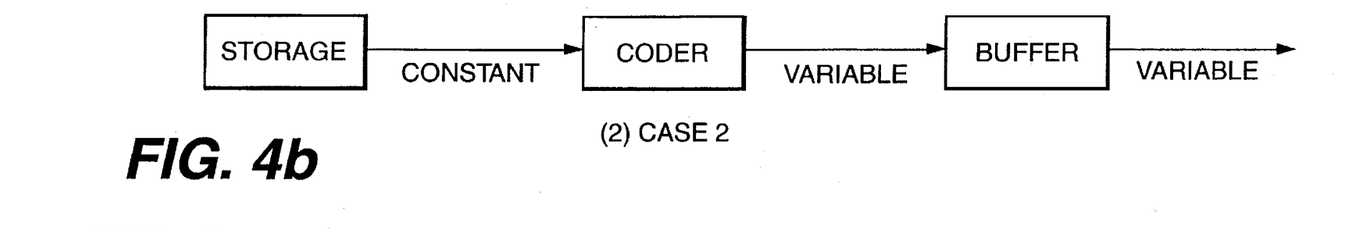

In the case No. 2 shown in FIG. 4b, a buffer is not provided after the coder, and an output of the coder is directly supplied to the transmission line. The transmission rate of information therefore changes with the degree of complexity of data stored in the storage, which is a so-called no-control state. If a buffer indicated by a broken line is provided, it is possible to control the transmission rate. However, since the data read speed at the storage is constant, controlling the transmission rate in accordance with the room capacity of the transmission line which is the gist of the invention becomes insufficient.

Figure 4C:
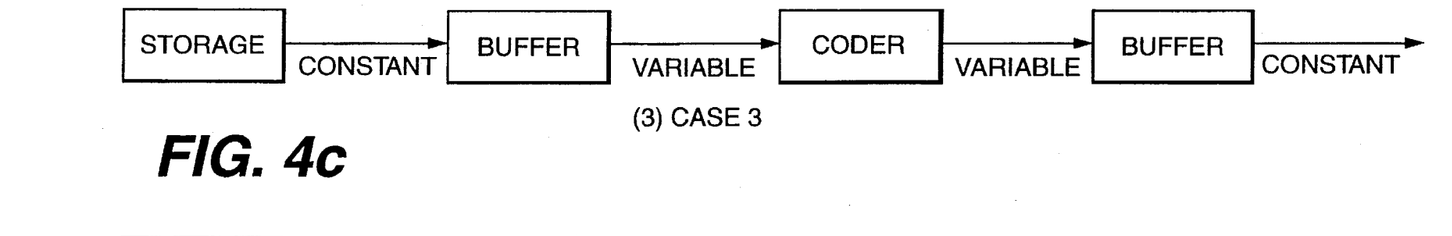

In the case No. 3 shown in FIG. 4c, the data transfer speed to the coder is made variable by the first buffer, and the transmission rate at the transmission line is made constant by the second buffer.

Figure 4D:
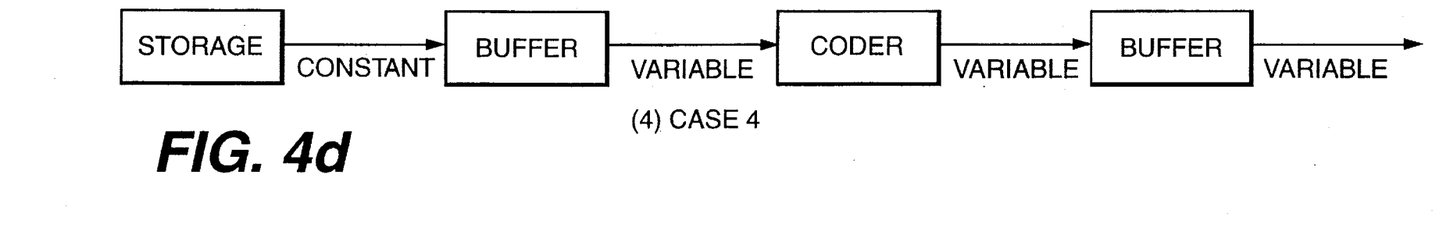

In the case No. 4 shown in FIG. 4d, the output from the coder shown in FIG. 4d is directly transmitted to the transmission line without passing through a buffer.

In the cases Nos. 5 to 8, the data read speed at the storage is made variable.

Figure 5A:
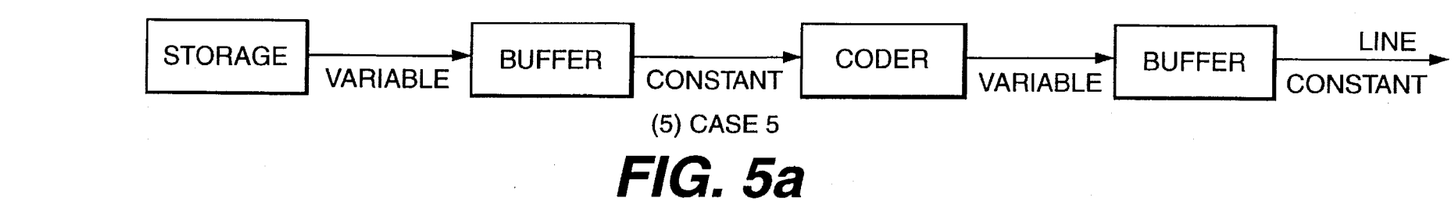
FIGS. 5a to 5d are block diagrams showing various types of variable data transfer configurations of an information provider set in accordance with the combinations shown in FIG. 3.

In the case No. 5 shown in FIG. 5a, the information transmission rate at the transmission line is made constant by the second buffer.

Figure 5B:
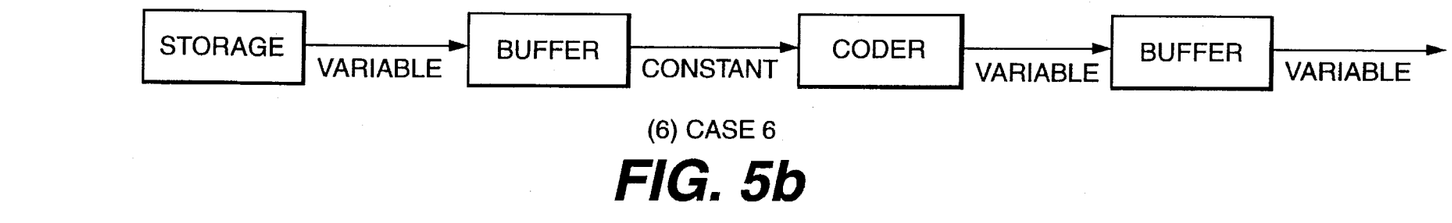

In the case No. 6 shown in FIG. 5b, the data transfer speed to the coder is made constant by the first buffer, and the output of the coder is directly transmitted to the transmission line.

Figure 5C:
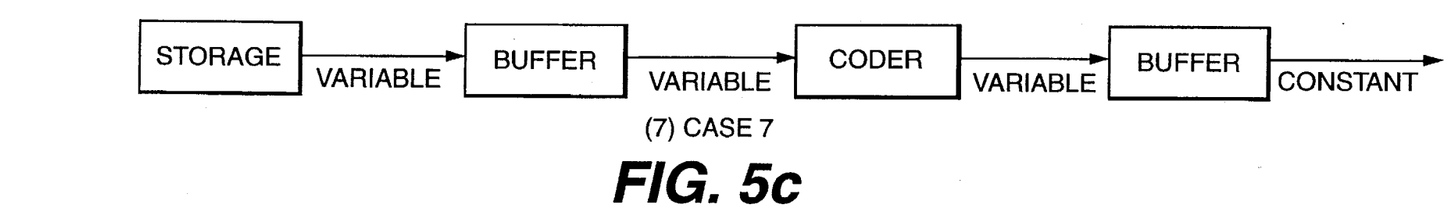

In the case No. 7 shown in FIG. 5c, the transmission rate at the transmission line is made constant by the second buffer.

Figure 5D:
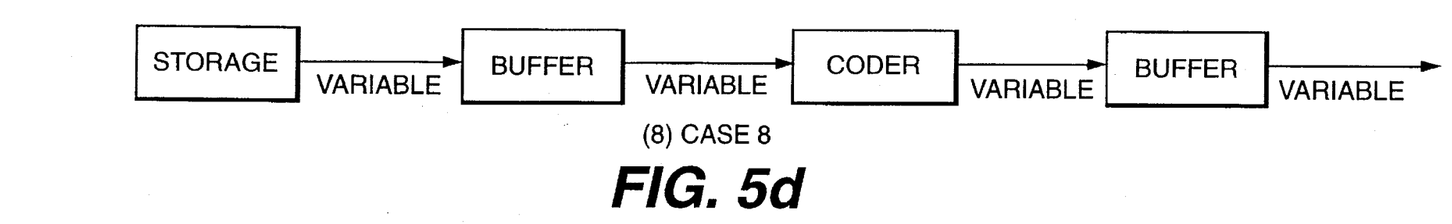

In the case No. 8 shown in FIG. 5d, the data input/output speed is made variable at each constitutional element of the information provider.

The object of the present invention to make the transmission rate variable in accordance with the traffic state of a transmission path (line) can be achieved from the conditions that in each of the cases Nos. 1 to 8, the output transmission velocity from the storage is variable, the output transmission velocity from the buffer including the first buffer is variable, and the transmission rate to the external transmission line can be variably controlled.

Of the cases Nos. 1 to 8, the cases Nos. 4, 6, and 8 satisfy the above conditions. In the case No. 2, although the data read speed at the storage is constant, the transmission rate at the transmission line is variable. However, if a buffer is not provided, the transmission rate becomes uncontrollable. If the object of the invention is to be achieved by using the configuration shown in FIG. 4b, information stored in the storage is required once stored in the buffer.

In the case No. 4, the data transfer speed at the first buffer including the storage is made variable. In this case, if the capacity of the first buffer is smaller than that of the storage, data in the storage cannot be transferred at a speed equal to or higher than a standard data transfer speed. However, in this case, it is not necessary to perform a mechanical process of changing the data read speed, such as a process of changing the rotation speed of a disk if it is used as the storage and a process of changing a running speed of a tape if it is used as the storage. Therefore this case No. 4 may be used if the bit cost of the buffer is lower than that of the storage. If a semiconductor memory is used as the storage, the case No. 4 can be used by forming the first storage in the semiconductor memory, the case No. 4 being equivalent as a whole to the case No. 8. Data read from the storage at a constant speed changes its speed at the first buffer and processed by the coder. Although the details of the coder will be described later, if clocks are generated from input data, an output of the coder can be adapted to change its speed in accordance with the speed of the input data. The output of the coder may be directly transmitted to the transmission line or its speed may be further changed by providing a buffer after the coder.

A difference between the cases Nos. 6 and 8 is whether an output of the first buffer is made constant or variable. The coding speed of a coder is generally determined in accordance with the frequency of clock signals used for coding. Therefore, if the coder has a coding speed comparative to the data transfer speed of the information provider, the data input speed to the coder is not necessarily required to be constant. In FIGS. 4a to 4d and 5a to 5d, only the signal flow between respective constitutional elements characteristic to this invention is shown. If coding clocks are generated from data outputted from the storage by using a PLL (Phase Locked Loop), the configuration of the case No. 8 can be used for coding data read from the storage at a variable speed and transmitting it at a variable transmission rate to the transmission line.

In both the cases Nos. 6 and 8, the data read speed of the storage is made variable. In the case No. 6, data read from the storage is changed to have a constant data transfer speed at the buffer, and supplied to the coder. In the case No. 6, data inputted to the coder at a constant speed is changed to data having a different speed, for example, by forcibly changing coding clocks, and outputted to the transmission line, or a buffer is provided after the coder to change the speed of data outputted from the coder to thus change the information transmission rate on the transmission line.

In the case No. 8, data is read from the storage at a variable speed and is directly processed by the coder. If clocks are generated from the input data to the coder, the speed of data outputted from the coder can be changed with the speed of the input data to the coder. A buffer may be provided before or after the coder if necessary to further control the data transfer speed or information transmission rate, or clocks of the coder may be forcibly changed to change the data transfer speed at the coder.

Figure 6:
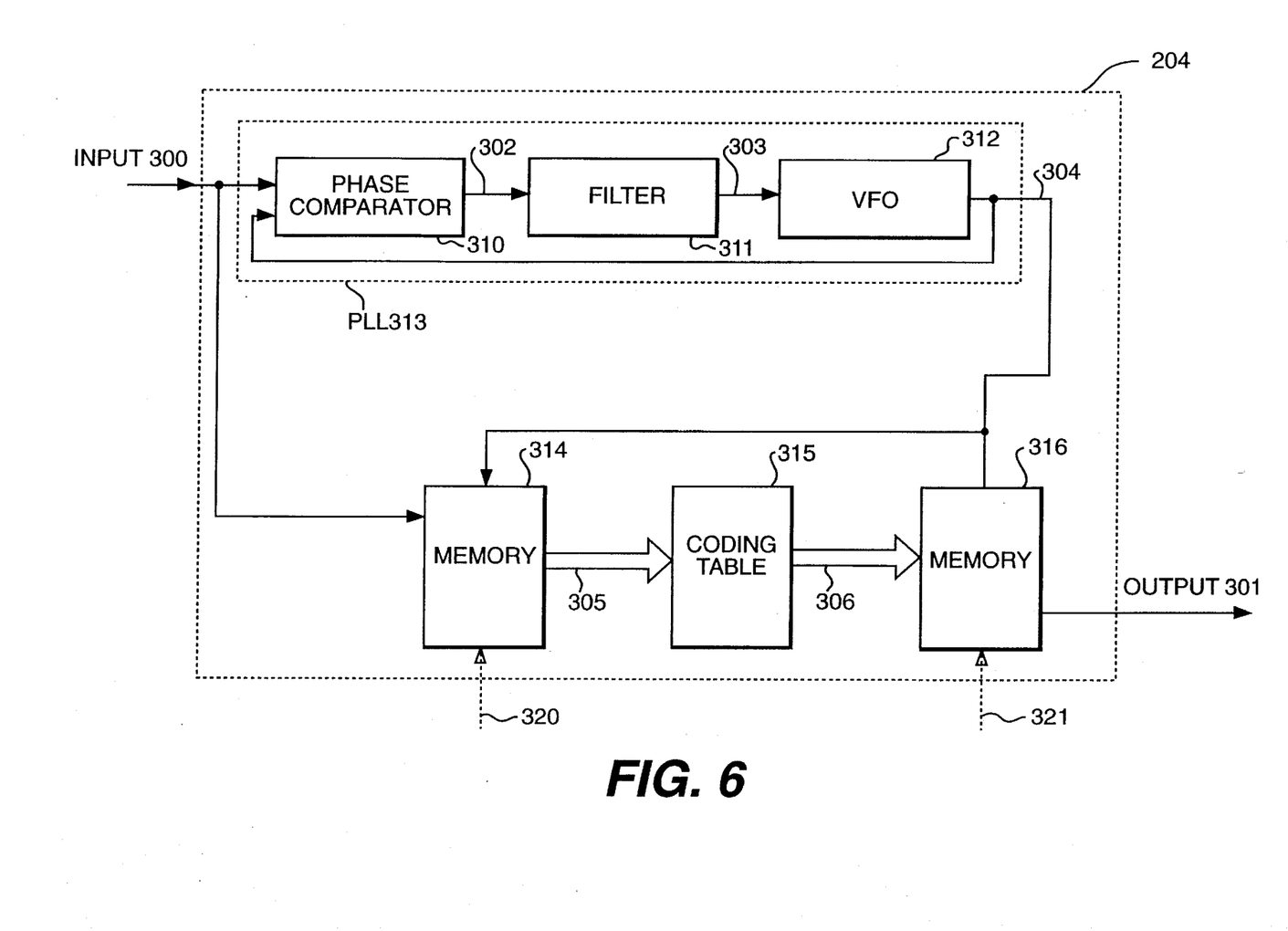
FIG. 6 is a block diagram showing the structure of a coder.

FIG. 6 shows an example of the structure of the coder 204. An input signal 300 supplied from the storage or buffer is inputted to a phase comparator 310 which outputs a phase error signal 302. This phase error signal 302 is inputted to a filter 311 for determining the operation bandwidth of a PLL 313. An output 303 from the filter 311 is inputted to a variable frequency oscillator 312 to allow it to generate a clock signal 304 from the input signal 300. PLL 313 may be a general PLL frequently used in information processing apparatuses or communications apparatuses, and is not limited to PLL 313 having the structure shown in FIG. 6. The clock signal 304 generated by PLL 313 is supplied to memories 314 and 316. The memory 314 operates as a shift register using the input signal 300 as its input data and the clock signal 304 as its input clocks. The input signal 305 is converted by the memory 314 from serial data into parallel data. This parallel data is supplied to a coding table 315 whereat it is modulated into data suitable for the transmission over the transmission line. The coding table 315 may be formed by a ROM (Read Only Memory). Data 306 converted by the coding table 315 is converted again from parallel data into serial data by the memory 316 to thereby generate an output signal 301.

The coder 204 shown in FIG. 6 performs coding by using self-clocks generated by PLL 313. Instead of the clock signal 304, an external clock signal 320, 321 may be used for forcibly changing the data transfer rate at the coder.

Figure 7:
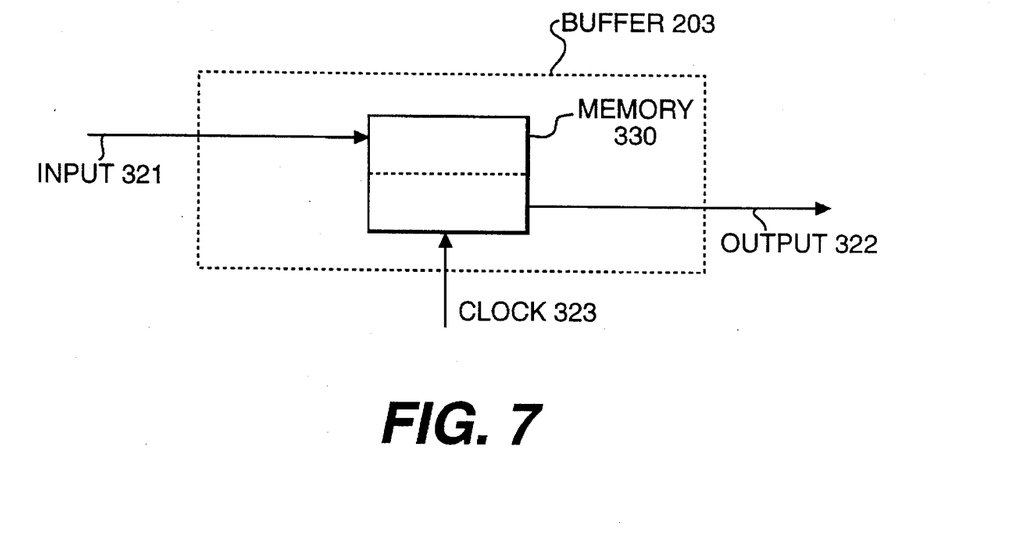
FIG. 7 is a block diagram showing the structure of a transmission line traffic monitor.

FIG. 7 shows an example of the structure of the buffer 203. The other buffers 205 and 208 may be realized by the same structure. A memory 330 is a two-port memory. This two-port memory 330 can read/write data of both an input signal 321 and output signal 322, and may be formed basically by a shift register or a FIFO (First In First Out). In the structure shown in FIG. 7, data of the input signal 321 is sequentially stored in the memory 330 synchronously with clock information derived from the input signal 324. A clock signal 324 is used for reading and outputting data from the memory 330. If the data transfer speeds of both the input signal 321 and output signal 322 are the same, the clock signal derived from the input signal 324 may be used also for reading data.

Figure 8:
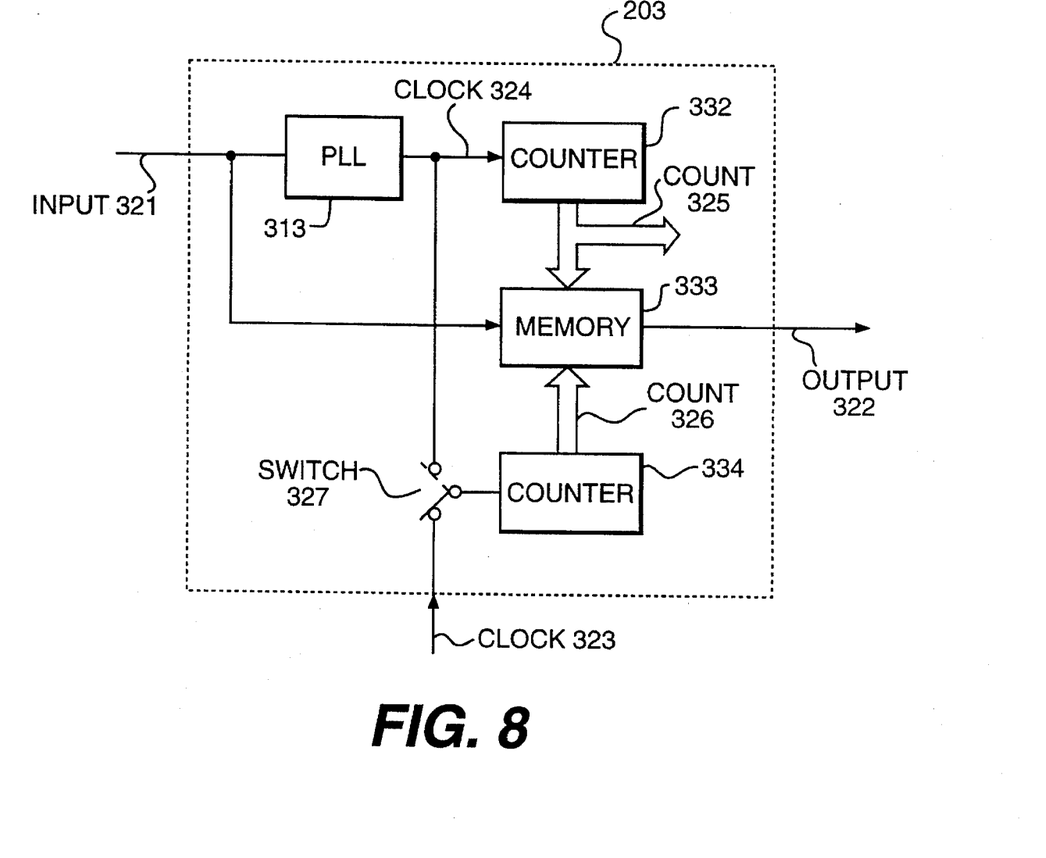
FIG. 8 is a block diagram showing the details of the transmission line traffic monitor.

FIG. 8 shows an example of the structure of the buffer 203 using a PLL 331. The fundamental structure of PLL is the same as FIG. 7. PLL 331 is a circuit for deriving clocks from the input signal 321 and has the same structure as PLL 313 shown in FIG. 6. The clock 324 generated by PLL 331 is inputted to a counter 332 which outputs a count 325. The input signal 321 is sequentially stored in a memory 333 synchronously with the count 325. Data stored in the memory 333 is read synchronously with a count 326 generated by another counter 334, and outputted as an output signal 322. The data transfer speed of the output signal 322 may be made equal to that of the input signal by operating the counter 334 in response to the clock 324 generated in the buffer 203, or may be made variable externally. In the latter case, a clock signal 323 is supplied via a switch 327 to the counter 334. By monitoring the count 325 periodically, the data transfer speed can be known at that time.

An example of the buffer in the information provider 101 shown in FIGS. 7 and 8 has been described. If such a buffer is provided on a transmission line, it is possible to monitor the transmission rate at the transmission line. This monitor means can be used in changing the information transmission rate in accordance with the room capacity of the transmission line, which the present invention aims to achieve.

Figure 9:
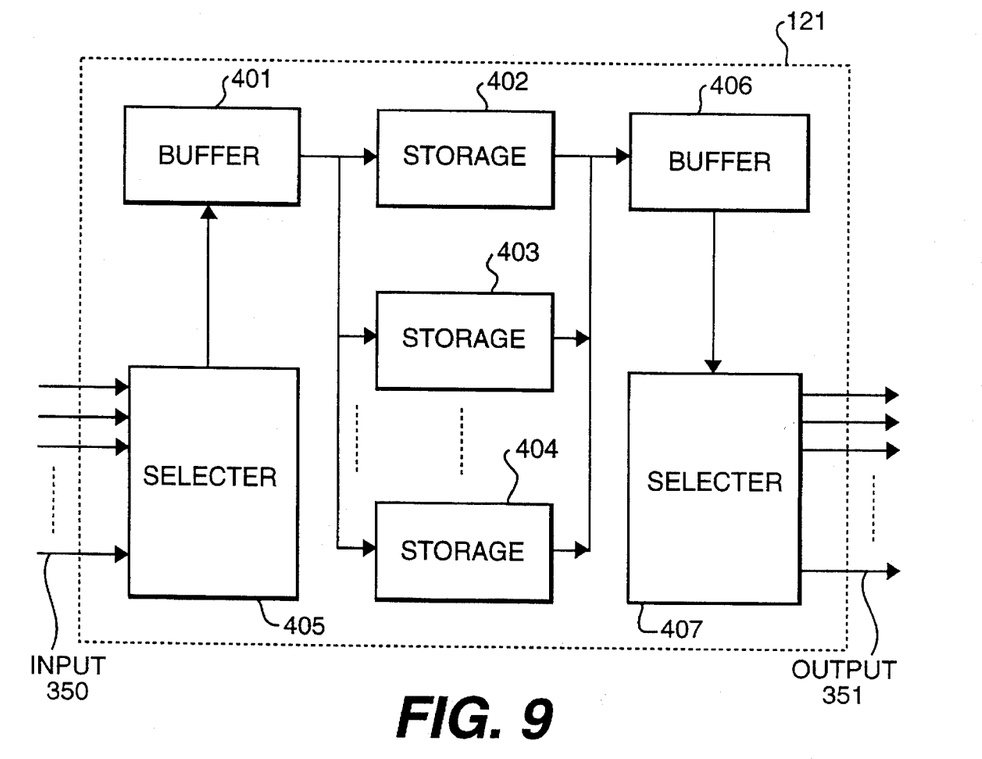
FIG. 9 is a block diagram showing the structure of an information storage and distribution unit.

FIG. 9 shows an example of the structure of the information storage and distribution unit 121. The structure shown in FIG. 9 is unidirectional. A bidirectional structure may also be realized easily. In the example shown in FIG. 9, input signals 350 correspond to signals from the information providers 101 to 103. Output signals 351 correspond to signals to be transmitted to the information receivers 111 to 113. The input signals are supplied to a selector 405. The input signal selected by the selector 405 is inputted to a buffer 401 and stored in storages 402 to 404. Although a plurality of storages are shown in FIG. 9, the storages and buffers may be omitted if the information storage and distribution unit performs only a relay function. Although not shown, by controlling the buffers 401 and 406 in accordance with an output from the traffic monitor means, the data transfer speed of an input/output signal can be controlled. Instead of using the buffers for the control of the data transfer speed, the storages 402 to 404 may be structured so as to have a variable data transfer speed by controlling the storages by an output of the traffic monitor means.

Figure 10:
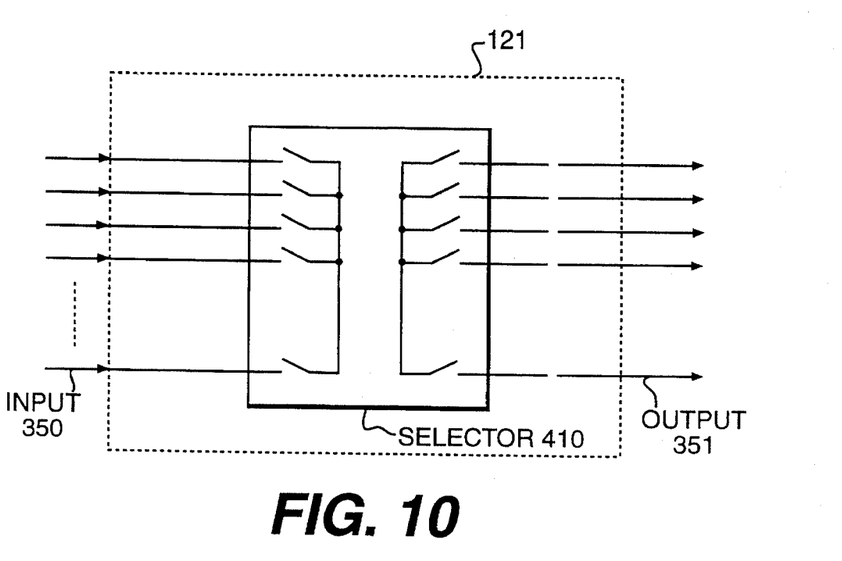
FIG. 10 is a circuit diagram showing another example of the information storage and distribution unit.

FIG. 10 shows the structure of the information storage and distribution unit in which the selector and buffer on the output side are omitted and only a signal selection is performed. In FIG. 9, a signal read from the storages 402 to 404 is inputted via the buffer 406 to a selector 407 and distributed as an output signal 351 which is then transmitted.

The information receiver shown in FIG. 1 may have the structure of the information provider shown in FIG. 2 with its signal paths being inverted. The information receiver has storages capable of providing a variable data transfer speed, means for transmitting a demand signal, means for reproducing audio and video information, and the like. A storage with a variable data transfer speed may be any one of a disc, a tape, and a semiconductor memory. In the case of a disc or a tape, it is necessary to change a relative speed between a storage medium and a read/write head in accordance with the information transmission rate.

For example, a spindle motor of a variable rotation speed may be used. In some cases, part of information may be lost during read/write at a mechanically changed variable rotation speed. Such a case can be eliminated by providing a buffer for absorbing a change in the data transfer speed mechanically generated. It is preferable in this invention to use a disk having at least one data read/write head so as to randomly access data.

According to the present invention, information can be transmitted at a higher speed in a shorter time if a room capacity of a transmission line is sufficient, and transmission resources such as transmission lines can be used time effectively, by using storages capable of providing a variable data read speed, by monitoring the room state of a transmission line, and by changing a transmission rate. This invention is applicable to various conventional transmission systems by adding the constitutional elements of the invention thereto, with the same advantageous effects described above.

What is claimed is:

1. An information transmission system having a plurality of information providing means, a plurality of information receiving means, information storage and distribution means connected to said information providing means and said information receiving means, and a plurality of information transmission paths for the information transmission between said information providing means, said information receiving means, and said information storage and distribution means, and means for changing information transmission rate at said information transmission path; and wherein said information providing means includes information storage means having a capability of changing an information input transmission rate, and said information storage and distribution means includes information storage means having a capability of changing an information output transmission rate.

2. An information transmission system according to claim 1, wherein said information providing means includes information storage means having a capability of changing an information output transmission rate, and said information storage and distribution means includes information storage means having a capability of changing an information input transmission rate.

3. An information transmission system according to claim 1, wherein said information receiving means includes a storage means having a capability of changing an input transmission rate and/or an output transmission rate.

4. An information transmission system according to claim 1, wherein said information storage and distribution means includes at least one information read/write head, and said information transmission rate is made variable by changing a relative motion speed between said head and an information storage medium.

5. An information transmission system according to claim 1, wherein said information storage an distribution means includes storage means being one of a disc, a tape, and a semiconductor memory, and an information transmission buffer memory provided between said storage means and said information transmission path and having a storage capacity smaller than the storage capacity of said storage means, said buffer memory being used for reading/writing information from and to said storage means.

6. An information transmission method comprising steps of, providing a plurality of information providing means, a plurality of information receiving means, information storage and distribution means connected to said information providing means and said information receiving means, and a plurality of information transmission paths for the information transmission between said information providing means, said information receiving means, and said information storage and distribution means, sending an information transmission request from said information receiving means to said information providing means via said information storage and distribution means, sending a requested information from said information providing means to said information receiving means via said information storage and distribution means, changing an information transmission rate at at least one of said information transmission paths; and wherein a transmission rate of said information transmission request is constant independently of a transmission capacity of said information transmission path.

7. An information transmission method according to claim 6, wherein an information transmission capacity of said information transmission path is detected and a transmission rate of information transmitted from said information storage and distribution means is changed in accordance with the detected information transmission capacity of said information transmission path.

8. An information transmission method according to claim 6, wherein transmission rates of information transmitted from and to said information storage and distribution means are controlled so as to make generally constant an average of said information transmission rates if said information transmission capacity of said transmission path changes.

9. An information transmission method according to claim 6, wherein if said transmission capacity of said information transmission path interconnecting said information providing means, said information receiving means, and said information storage and distribution means decreases, a different transmission path is selected from said transmission paths to continue information transmission via said selected transmission path.

10. An information transmission method according to claim 6, wherein said information transmission rate is increased when said transmission capacity of said information transmission path increases and said information transmission rate is decreased when said transmission capacity of said information transmission path decreases.

11. An information transmission method according to claim 10, wherein transmission rates of information transmitted from and to said information storage and distribution means are changed in accordance with an increase/decrease of said transmission capacity of said information transmission path.

12. An information transmission method according to claim 6, wherein non real-time information is transmitted to said information transmission path during the time period while the amount of real-time information is small and said transmission capacity of said information transmission path is large.

13. An information transmission method according to claim 12, wherein if the whole of a unit of said non real-time information stored in said information storage and distribution means cannot be completely transmitted in said time period while said transmission capacity of said information transmission path is large, the non real-time information still not transmitted is transmitted as real-time information.

14. An information transmission method according to claim 12, wherein information transmission is stopped when a transmission available amount of said information transmission path becomes lower than a predetermined value.

15. An information transmission method according to claim 14, wherein the information transmission stopped resumes when said transmission available amount of said information transmission path increases higher than said predetermined value.

16. An information transmission system comprising information providing means, information storage and distribution means connected to said information providing means via a first transmission path, information receiving means connected to said information storage and distribution means via a second transmission path, wherein said information storage and distribution means and/or information providing means includes traffic monitoring means for monitoring a transmission capacity of one of said first and second transmission paths; and wherein said information providing means and/or said information receiving means includes a storage for storing information with a variable information read/write speed, and a coder connected to said storage, wherein said information read/write speed of said storage is controlled in accordance with results of monitoring by said traffic monitoring means.

17. An information transmission system according claim 16, wherein said information providing means and/or said information receiving means includes a storage for storing information, a buffer memory connected to said storage, and a coder connected to said buffer memory, wherein said buffer memory is controlled in accordance with monitor results of said traffic monitoring means.

18. An information transmission system according to claim 16, wherein said information providing means and/or said information receiving means includes a storage for storing information with a variable information read/write speed, and a coder connected to said storage, wherein said information read/write speed of said storage is controlled in accordance with monitor results of said traffic monitoring means.

19. An information transmission system according to claim 16, wherein said information storage and distribution means includes input means for inputting information, and a read/write unit for reading/writing information from said input means at a variable read/write speed in accordance with the monitor results of said traffic monitoring means.

20. An information transmission system according to claim 16, wherein said traffic monitoring means includes a PLL for generating a clock signal from an information signal, and a counter for counting said clock signal, and wherein said information transmission rate is monitored from a count of said counter.

21. An information transmission system according to claim 16, wherein said information providing means and/or said information receiving means includes a storage for storing information, a coder for coding information read from storage, and means for changing a transmission rate of said information inputted to said coder in accordance with an output from said traffic monitoring means.

22. An information transmission system according to claim 21, wherein a buffer memory is connected after said coder, said buffer memory being controlled by the monitor results of said traffic monitoring means.

23. An information transmission method for an information transmission system comprising the steps of;

providing a plurality of information providing means, providing a plurality of information receiving means, providing an information storage and distribution means connected to said plurality of information providing means and said plurality of information receiving means, transmitting information from the plurality of information providing means to the plurality of information receiving means via the information storage and distribution means, wherein an information transmission rate between the plurality of information providing means, the plurality of information receiving means, and the information storage and distribution means is variable; and said information transmission rate is increased when a transmission capacity of said information transmission path increases and said information transmission rate is decreased when said transmission capacity of said information transmission path decreases.

24. An information transmission method comprising steps of, providing a plurality of information providing means, a plurality of information receiving means, information storage and distribution means connected to said information providing means and said information receiving means, and a plurality of information transmission paths for the information transmission between said information providing means, said information receiving means, and said information storage and distribution means, sending an information transmission request from said information receiving means to said information providing means via said information storage and distribution means, sending a requested information from said information providing means to said information receiving means via said information storage and distribution means, changing an information transmission rate at at least one of said information transmission paths; and wherein non real-time information is transmitted to said information transmission path during the time period while the amount of real-time information is small and said transmission capacity of said information transmission path is large.

* * * * *